United States Patent
Ehlermann et al.

(10) Patent No.: US 11,467,078 B2
(45) Date of Patent: Oct. 11, 2022

(54) LASER-INDUCED INCANDESCENT PARTICLE SENSOR COMPRISING A CONFOCAL ARRANGEMENT OF A LASER SPOT AND OF A THERMAL RADIATION SPOT

(71) Applicant: Robert Bosch GmbH, Stuttgart (DE)

(72) Inventors: Jens Ehlermann, Kirchheim Unter Teck (DE); Matthias Wichmann, Gaertringen (DE); Radoslav Rusanov, Stuttgart (DE); Tobias Werner, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 16/966,374

(22) PCT Filed: Feb. 15, 2019

(86) PCT No.: PCT/EP2019/053810
§ 371 (c)(1),
(2) Date: Jul. 30, 2020

(87) PCT Pub. No.: WO2019/170393
PCT Pub. Date: Sep. 12, 2019

(65) Prior Publication Data
US 2020/0371009 A1    Nov. 26, 2020

(30) Foreign Application Priority Data
Mar. 6, 2018  (DE) .......................... 102018203301.3

(51) Int. Cl.
*G01N 15/06* (2006.01)
*G01N 21/71* (2006.01)
(Continued)

(52) U.S. Cl.
CPC ......... *G01N 15/06* (2013.01); *G01N 15/0205* (2013.01); *G01N 21/71* (2013.01);
(Continued)

(58) Field of Classification Search
CPC .... G01N 15/06; G01N 15/0205; G01N 21/71; G01N 1/2252; G01N 2015/0046; G01N 2015/0693
See application file for complete search history.

(56) References Cited

U.S. PATENT DOCUMENTS

| 5,920,388 A | * | 7/1999 | Sandberg | ........... G01N 15/0205 356/315 |
| 2010/0255518 A1 | * | 10/2010 | Goix | .................. G01N 33/6887 435/16 |

(Continued)

FOREIGN PATENT DOCUMENTS

| EP | 0959329 A2 | 11/1999 |
| GB | 2459452 A | 10/2009 |

(Continued)

OTHER PUBLICATIONS

International Search Report for PCT/EP2019/053810, dated Jun. 5, 2019.
B.F. Kock, et al., "Two-Color Time-Resolved LII Applied to Soot Particle Sizing," Combustion and Flame, vol. 147, 2006, pp. 79-92.
S. Schraml, "Application of a New Soot Sensor for Exhaust," SAE Technical Paper Series, 2000, pp. 1-12.

*Primary Examiner* — Benjamin R Schmitt
(74) *Attorney, Agent, or Firm* — Norton Rose Fulbright US LLP; Gerard Messina

(57) ABSTRACT

A particle sensor is described. The particle sensor includes a laser module having a laser, and a detector configured to detect thermal radiation. The particle sensor has an optical apparatus that is configured to focus laser light proceeding from the laser module into a first spot and is configured to
(Continued)

focus thermal radiation proceeding from the first spot into a second spot, a radiation-sensitive surface of the detector being located in the second spot, or behind the second spot in the beam path of the thermal radiation focused onto the second spot.

15 Claims, 6 Drawing Sheets

(51) Int. Cl.
    *G01N 15/02*     (2006.01)
    *G01N 1/22*     (2006.01)
    *G01N 15/00*     (2006.01)

(52) U.S. Cl.
    CPC .............. *G01N 1/2252* (2013.01); *G01N 2015/0046* (2013.01); *G01N 2015/0693* (2013.01)

(56) References Cited

U.S. PATENT DOCUMENTS

| | | | |
|---|---|---|---|
| 2010/0328665 A1* | 12/2010 | Kaye | G01J 3/021 356/342 |
| 2015/0276589 A1* | 10/2015 | Wagner | G01N 15/0205 356/440 |
| 2017/0322133 A1* | 11/2017 | Trainer | G01N 15/0211 |
| 2017/0342923 A1 | 11/2017 | Zhang | |
| 2019/0017915 A1* | 1/2019 | Obata | G01N 21/51 |

FOREIGN PATENT DOCUMENTS

| | | |
|---|---|---|
| JP | H10227737 A | 8/1998 |
| JP | 2005156221 A | 6/2005 |
| JP | 2007527997 A | 10/2007 |
| JP | 2010085352 A | 4/2010 |
| JP | 2012500385 A | 1/2012 |
| JP | 2012519278 A | 8/2012 |

* cited by examiner

LASER-INDUCED INCANDESCENT PARTICLE SENSOR COMPRISING A CONFOCAL ARRANGEMENT OF A LASER SPOT AND OF A THERMAL RADIATION SPOT

FIELD

The present invention relates to a particle sensor. A particle sensor of this kind has a laser module having a sensor, and a detector configured to detect thermal radiation.

BACKGROUND INFORMATION

The principle of laser-induced incandescence (LII) for the detection of nanoparticles in air is described, for instance, in the articles by B. F. Kock, "Two-color time-resolved LII applied to soot particle sizing, Combustion and Flame", 2006, and by S. Schraml, "Application of a new soot sensor for exhaust," SAE Technical Paper Series, 2000, and is intensively utilized, for instance, to characterize the combustion process in "glass" engines in the laboratory, or for exhaust gas characterization. In this context, the soot particles produced upon combustion are heated to several thousand degrees Celsius with a nanosecond pulse of a high-powered laser, and the thermal light emission of the particle is measured with a light detector. The method allows the detection of very small particles having a diameter of a few tens of nm.

It is possible to expand this principle to the detection of soot particles in the exhaust section of diesel engines or gasoline engines of motor vehicles. Here an inexpensive continuous-wave (CW) laser diode is used to heat soot particles at the focus of the laser beam so intensely that they emit a considerable thermal light signal that is detectable with a detector, for instance a photodiode.

SUMMARY

The present invention provides, in this connection, a the particle sensor which has an optical apparatus that is configured to focus laser light proceeding from a laser module into a first spot and is configured to focus thermal radiation proceeding from the first spot into a second spot, a radiation-sensitive surface of the detector being located in the second spot, or behind the second spot in the beam path of the thermal radiation focused onto the second spot.

The present invention is based on the recognition that in the context of detection of measured signals of a laser-induced incandescence that is generated in the exhaust section of motor vehicles, extraneous light caused by thermal radiation of the hot environment in the vicinity of the spot (hot exhaust duct, hot sensor head) can occur. The absolute power level of the extraneous light at the detector can be very low (a few N), but in some circumstances causes a detector signal that is orders of magnitude stronger than that of the particle that is actually to be measured, whose measurement signal can lie in the Po range. A problem furthermore exists in terms of ascertaining a particle size distribution based on the detected measured signals generated by particles that pass through the spot in its edge region. Because the power density of the first spot is lower there, the temperature produced there is lower than for particles that pass through the center of the first spot. This results in weaker LII signals that can easily be mistaken for LII signals of smaller particles. Signals of particles at the edge of the focus are thus undesired, since they result in incorrect evaluation.

The present invention solves this problem ultimately by way of a confocal detection method for the detection of particles. Thanks to this confocal detection method according to the present invention, only thermal radiation of the light from a sharply delimited spatial region, namely from the first spot or from a portion of the first spot, is directed in controlled fashion onto the detector, and thermal radiation deriving from outside that sharply delimited spatial region does not arrive at the radiation-sensitive detection surface. The result of these features is to decrease the influence of components of thermal radiation which do not derive directly from the first spot, or better from the center of the first spot, on the signal generated by the detector.

An example embodiment of the present invention combines a method of confocal detection with the optical detection of soot particles in the exhaust section using laser-induced incandescence. With the aid of this combination, it is possible to almost completely suppress the thermal interference signal that derives from the hot environment, and thus to significantly increase the signal-to-noise ratio, so that detection of the very low-power LII signals becomes easier. This method furthermore results in a reduction in false signals, since the only LII signals reaching the detector are those that derive from particles in the immediate environment of the focus.

A preferred embodiment of the present invention is notable for the fact that the optical apparatus has a beam splitter and a first focusing optical element, the beam splitter being disposed in the beam path of the laser light between the laser module and the first focusing optical element.

It is also preferred that the first focusing optical element be configured to direct thermal radiation proceeding from the first spot onto the beam splitter; and that the detector be disposed in a beam path of the thermal radiation which proceeds from the beam splitter.

As a result of the beam splitter, the same optical elements can be used in part for the beam path leading from the laser module to the first spot and for the beam path leading from the first spot to the second spot.

It is further preferred that the first spot be located at a first focal point of the first focusing optical element; and that the second spot be located at a second focal point of the first focusing optical element. This configuration has the advantage of requiring only a few optical elements.

A further preferred embodiment of the present invention is notable for the fact that the optical apparatus has a second focusing optical element, the second focusing optical element being disposed in a beam path of the thermal radiation which proceeds from the beam splitter, and being configured to focus thermal radiation incident from the beam splitter into the second spot. This embodiment in particular affords more degrees of freedom when designing the optical system.

It is also preferred that a wavelength-selective optical filter, which is less transparent to the laser light than to the thermal radiation proceeding from the spot, be disposed, between the beam splitter and the second focusing optical element, in the beam path of the thermal radiation proceeding from the beam splitter. As a result of this feature, laser light of undesired reflection and/or refraction can be filtered out before it is incident onto the detector. The result is a desirable improvement in the signal-to-noise ratio, and thus higher measurement sensitivity and measurement accuracy.

It is furthermore preferred that in the context of an example embodiment of the present invention in which the radiation-sensitive surface of the detector is located behind the second spot in the beam path of the thermal radiation focused onto the second spot, the second spot be located in the opening of an orifice plate that is disposed in the beam path of the thermal radiation between the beam splitter and the detector. The effect of such an orifice plate is that radiation constituents that do not derive directly from the first spot, but instead derive from points that are located slightly in front of or behind the first spot, or to the right or left of the first spot, or above or below the first spot, are kept away from the detector. Those radiation constituents lie in the plane of the orifice plate opening alongside the orifice plate opening on the opaque part of the orifice plate.

A further preferred embodiment of the present invention is notable for the fact that a third optical element, which parallelizes thermal radiation proceeding from the orifice plate opening, is disposed in the beam path of the thermal radiation between the orifice plate and the detector; and that a fourth optical element, which focuses the thermal radiation parallelized by the third optical element onto the detector, is disposed in the further beam path of the thermal radiation. These features make it possible in particular to extend, and to change the direction of, the optical path between the beam splitter and the detector, affording degrees of freedom in terms of designing the particle sensor.

It is also preferred that the optical apparatus have a further optical element that is disposed in the beam path of the laser light between the laser module and the beam splitter and is configured to parallelize laser light proceeding from the laser module and to direct it onto the beam splitter. "Parallelization" is understood here as a decrease in the aperture angle of a light bundle or radiation bundle; the parallelization does not necessarily need to be taken to completion (zero aperture angle). Parallelization decreases the beam cross section of the laser light incident onto the beam splitter, with the result that the beam splitter can be smaller than it would be without prior parallelization.

It is further preferred that the laser be a semiconductor laser element, in particular a laser diode. This embodiment has the advantage that inexpensive and robust laser diodes are obtainable commercially.

It is also preferred that the beam splitter be a polarizing beam splitter; and that the polarizing beam splitter be configured in such a way that it is maximally transparent to incident laser light having a predetermined polarization direction. Laser light often occurs in polarized form. Thanks to the polarizing beam splitter and its orientation matched to the polarization of the laser light, a large part of the laser light can be used for signal generation.

Because laser light 10 is generally already polarized, it can pass in one direction (toward first spot 22) through the polarizing beam splitter with practically zero loss when the disposition is selected to match the polarization direction of the polarizing beam splitter. In other words, correct selection of the laser polarization and the orientation of the laser allows the transmitted power output at that point to be maximized (almost 100%), whereas a power loss of approximately 50% upon transmission through the beam splitter must be accepted with usual non-polarizing beam splitters.

It is further preferred that the laser be configured to emit laser light having wavelengths below 500 nm, in particular of 405 nm, 450 nm, or 465 nm; and that the optical filter be configured in such a way that it attenuates or in fact blocks light having wavelengths below 500 nm. These features result in an improvement in the signal-to-noise ratio as compared with embodiments that do not have such a filter.

A further preferred embodiment of the present invention is notable for the fact that the particle sensor has a first part that is configured to be exposed to a measured gas, and has a second part that is configured not to be exposed to the measured gas and contains the optical components of the particle sensor, the two parts being separated by a partition that is impermeable to the measured gas. The optical components can thereby be disposed separately from the measured-gas flow, so that the sensor is also usable for measuring particle concentrations in hot and chemically aggressive measured gases, such as exhaust gases of internal combustion engines.

It is also preferred that a window, which is transparent both to the laser light and to radiation proceeding from the spot, be mounted in the partition in the beam path of the laser light.

It is further preferred that the particle sensor have an assemblage made up of an outer protective tube and an inner protective tube, both of which have a generally cylindrical shape or prismatic shape; that the protective tubes be disposed coaxially, the axes of the cylindrical or prismatic shapes being oriented parallel to the direction of incidence of the laser light and the spot being located in the interior of the inner protective tube; that outer protective tube 28 project, at its end facing toward the laser, beyond inner protective tube 30; and that inner protective tube 30 project, at the opposite end, beyond outer protective tube 28.

Further advantages are evident from the description herein, and from the Figures.

The example particle sensor according to the present invention can be used as a soot particle sensor for measuring soot-particle concentrations, masses, and speeds in the exhaust gas of internal combustion engines. It can also be used, however, to measure other particle concentrations in a gas, for instance to measure particulate matter in indoor air or outdoors.

It is understood that the features recited above and those yet to be explained below are usable not only in the respective combination indicated but also in other combinations or in isolation, without departing from the scope of the present invention.

Exemplifying embodiments of the present invention are depicted in the figures and are explained in further detail in the description below. Reference characters that are the same in different Figures refer in each case to elements that are the same or at least comparable in terms of function.

DETAILED DESCRIPTION OF EXAMPLE EMBODIMENTS

Figure 1:
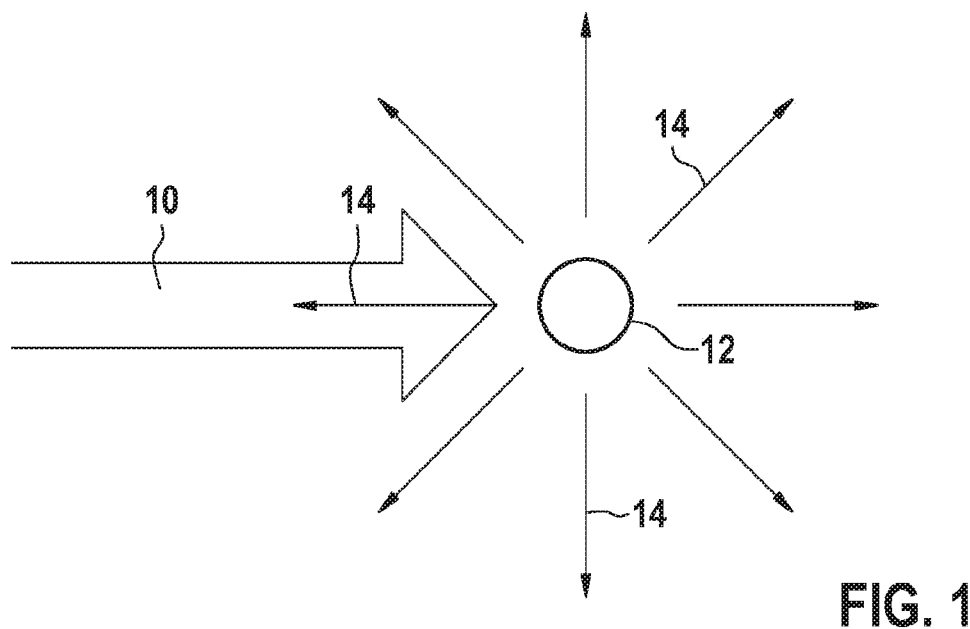
FIG. 1 illustrates a measurement principle, based on laser-induced incandescence, that is used in the context of the present invention.

FIG. 1 illustrates the measurement principle based on laser-induced incandescence (LII). High-intensity laser light 10 strikes a particle 12. The intensity of laser light 10 is so high that the energy of laser light 10 absorbed by particle 12 heats particle 12 to several thousand degrees Celsius. As a result of being heated, particle 12 spontaneously emits significant radiation 14, in substantially no preferred direction, in the form of thermal radiation hereinafter also referred to as "LII light." Some of radiation 14 emitted in the form of thermal radiation is therefore also emitted oppositely from the direction of the incident laser light 10.

Figure 2:
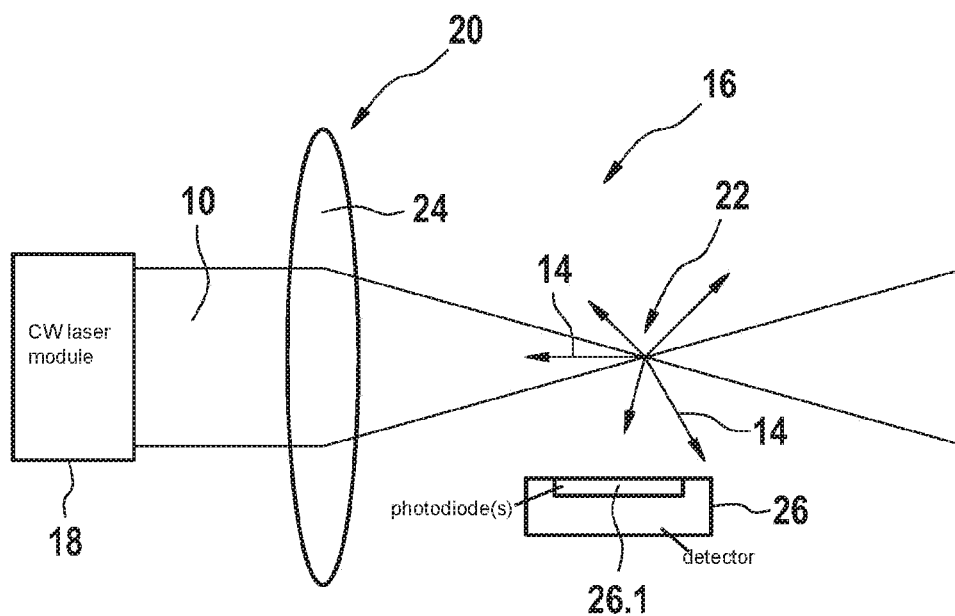
FIG. 2 schematically depicts a configuration of a particle sensor operating with laser-induced incandescence.

FIG. 2 schematically shows a general configuration of a particle sensor 16. Particle sensor 16 here has a continuous-wave (CW) laser module 18 whose (preferably parallel) laser light 10 is focused, using at least one first focusing optical element 20 disposed in the beam path of CW laser module 18, onto a very small first spot 22. First focusing optical element 20 is preferably a first lens 24. It is only in the volume of first spot 22 that the intensity of laser light 10 reaches the large values necessary for LII. The invention is not limited to the use of a CW laser. It is also possible to use lasers operated in pulsed fashion.

The dimensions of first spot 22 are in the range of a few μm, in particular in the range of at most 200 μm, so that particles 12 passing through first spot 22 are excited to emit evaluatable radiation power levels, either by laser-induced incandescence or by chemical reactions (especially oxidation). As a consequence, it can be assumed that at most one particle 12 is ever present in first spot 22, and that an instantaneous measured signal of particle sensor 16 derives only from that at most one particle 12. The measured signal is generated by a detector 26 that is disposed in particle sensor 16 in such a way that it detects radiation 14, in particular thermal radiation, that proceeds from a particle 12 that is traversing first spot 22. Detector 26 has at least one photodiode 26.1 for that purpose.

It is entirely possible for the laser of laser module 18 to be modulated or switched on and off (duty cycle<100%). It is still preferred, however, that the laser of laser module 18 be a CW laser. This makes possible the use of inexpensive semiconductor laser elements (laser diodes), thereby reducing the cost of particle sensor 16 as a whole and greatly simplifying control application to laser module 18 and evaluation of the measured signal. The use of pulsed lasers is, however, not excluded.

Figure 3:
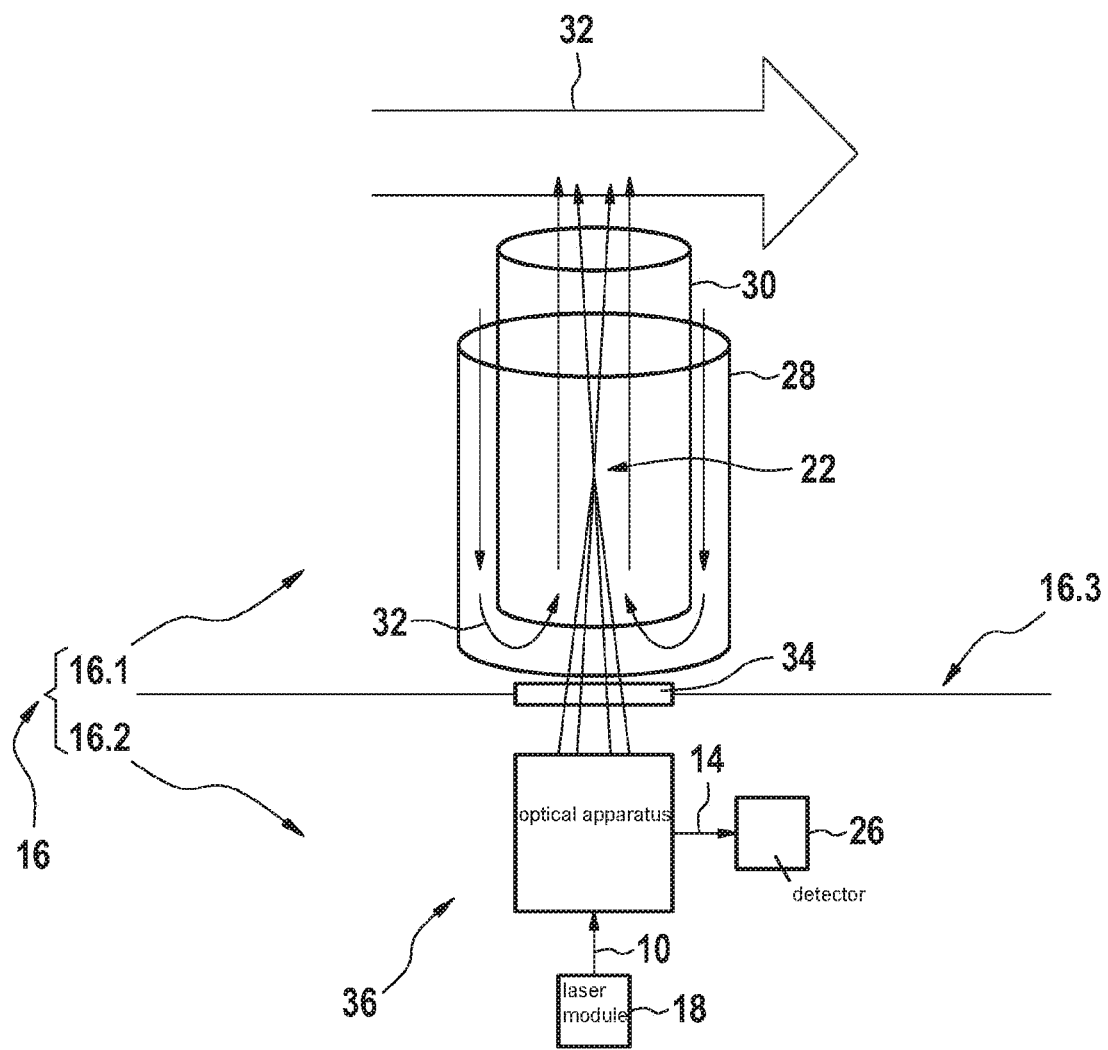
FIG. 3 shows a first exemplifying embodiment of a particle sensor according to the present invention.

FIG. 3 shows an advantageous exemplifying embodiment of a particle sensor 16 according to the present invention that is suitable for use as a soot particle sensor in the exhaust gas of a combustion process.

Particle sensor 16 has a first part 16.1 that is configured to be exposed to a measured gas, and it has a second part 16.2 which is not exposed to the measured gas and which contains the optical components of particle sensor 16. The two parts are separated by a partition 16.3 that is impermeable to the measured gas. A window 34, which is transparent both to laser light 10 and to the radiation proceeding from first spot 22, is mounted in the partition in the beam path of laser light 10.

First part 16.1 of particle sensor 16 has an assemblage made up of an outer protective tube 28 and an inner protective tube 30. The two protective tubes 28, 30 preferably have a generally cylindrical or prismatic shape. The base surfaces of the cylindrical shapes are preferably circular, elliptical, or polygonal. The cylinders are preferably disposed coaxially, the axes of the cylinders being oriented perpendicularly to the flow of exhaust gas 32. Inner protective tube 30 projects, in the direction of the axes, beyond outer protective tube 28 into the flow of exhaust gas 32. At that end of the two protective tubes 28, 30 which faces away from the flow of exhaust gas, outer protective tube 28 projects beyond inner protective tube 30. The inside width of outer protective tube 28 is preferably sufficiently larger than the outside diameter of inner protective tube 30 that a first flow cross section is produced between the two protective tubes 28, 30. The inside width of inner protective tube 30 constitutes a second flow cross section.

The consequence of this geometry is that exhaust gas 32 enters the assemblage of the two protective tubes 28, 30 via the first flow cross section, then changes direction at that end of protective tubes 28, 30 which faces away from exhaust gas 32, enters inner protective tube 30, and is drawn out of the latter by exhaust gas 32 flowing past. This produces a laminar flow in inner protective tube 30. This assemblage of protective tubes 28, 30 is fastened, with particle sensor 16, transversely to the exhaust flow on or in an exhaust duct. This type of first part 16.1 of a particle sensor is a constituent of a preferred exemplifying embodiment. Its features are not, however, features important to the present invention. The features important to the present invention are constituents of second part 16.2 of particle sensor 16.

Second part 16.2 has a laser module 18, an optical apparatus 36, and a detector 26.

Figure 4:
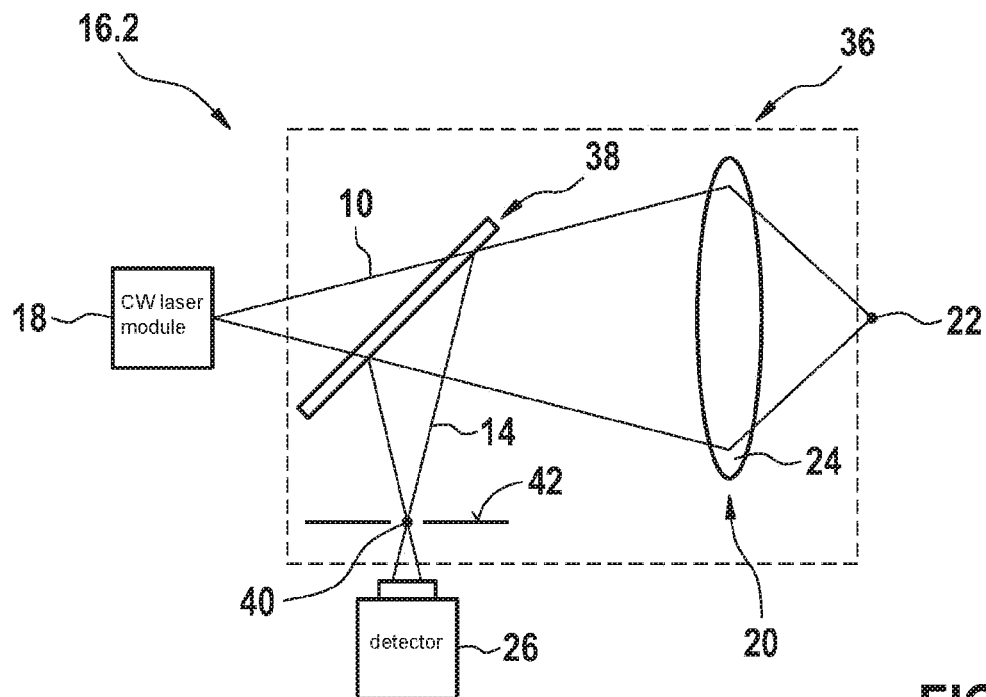
FIG. 4 shows an exemplifying embodiment of an optical part of a particle sensor according to the present invention that operates with non-parallel beam paths.

FIG. 4 shows an exemplifying embodiment of optical apparatus 36 together with laser module 18 and detector 26, i.e. an exemplifying embodiment of second part 16.2 of particle sensor 16. Optical apparatus 36 has, in particular, a beam splitter 38 and a first focusing optical element 20. Laser light 10 of laser module 18 is focused into first spot 22 via beam splitter 38, which can be e.g. a dichroic mirror or a beam splitter cube, and a first focusing optical element 20. First focusing optical element 20 is preferably a lens 24. A particle 12 traversing the first spot is heated by the laser light and consequently emits thermal radiation. Because of its small size, particle 12 can be regarded as a point light source.

First spot 22 is located in the interior of inner protective tube 30. In this first spot 22, the laser light intensity is high enough to heat soot particles 12, transported along with exhaust gas 32, to several thousand degrees Celsius, so that the heated particles 12 emit significant radiation 14 in the form of thermal radiation. Radiation 14 lies, for instance, in the near infrared and visible spectral region, although the invention is not limited to radiation 14 in that spectral region.

A portion of that radiation 14, emitted nondirectionally in the form of thermal radiation, is incident onto first focusing optical element 20 and propagates via beam splitter 38 to detector 26, that portion being focused by first focusing optical element 20 onto a second spot 40. In the exemplifying embodiment of FIG. 4, second spot 40 is located at a focal point of first focusing optical element 20, or conversely, the focal point is located in second spot 40. Independently of the specific exemplifying embodiment of FIG. 4, it is the case that second spot 40 is located at a focal point of optical apparatus 36, or conversely that a focal point of optical apparatus 36 is located in second spot 40.

Detector 26 is disposed in the beam path of radiation 14 proceeding from beam splitter 38 in such a way that its radiation-sensitive surface is located in second spot 40, or behind second spot 40 in the beam path of radiation 14 focused onto second spot 40. In the exemplifying embodiment depicted in FIG. 4, detector 26 is located behind second spot 40 in the beam path of radiation 14. In the exemplifying embodiment depicted, second spot 40 is located on the opening of an orifice plate 42, so that detector 26 records only radiation that is incident onto its radiation-sensitive surface through the opening.

Radiation 14 that derives from regions located in front of, behind, to the right of, to the left of, above, or below first spot 22 is blocked by orifice plate 42, since that radiation is directed by optical apparatus 36 onto edge regions of orifice plate 42 that are located next to the opening of orifice plate 42 and are not transparent to radiation 14. Radiation 14 deriving from those regions is, for instance, thermal interference radiation from the environment, or signals of particles that are passing through first spot 22 at its edge. These portions of the thermal radiation therefore do not arrive at detector 26 and therefore do not distort the measured signal.

A considerably improved signal-to-noise ratio (SNR) is consequently obtained. A different behavior is exhibited, conversely, by thermal radiation deriving from first spot 22, which is directed by the optical apparatus precisely onto the orifice-plate opening. The entirety of that thermal radiation can pass through the orifice plate, provided the orifice plate diameter is not less than a specific minimum size. Be it noted at this juncture that the diameter can also be selected to be smaller than that minimum size. In that case a considerably reduced detector signal must be expected. For the orifice plate that is utilized, orifice plates having both fixed and variably adjustable diameters can be used. The latter allow the filtering effect to be adjusted over a wide range.

Beam splitter 38 brings about, in optical apparatus 36, a particularly important advantage that only one optical access to exhaust gas 32 is required, since the same optical system, in particular the same first focusing optical element 20, is used to generate first spot 22 and to detect radiation 14 proceeding from particle 12.

Exhaust gas 32 is an example of a measured gas. The measured gas can also be a different gas or gas mixture, for instance indoor air.

Figure 5:
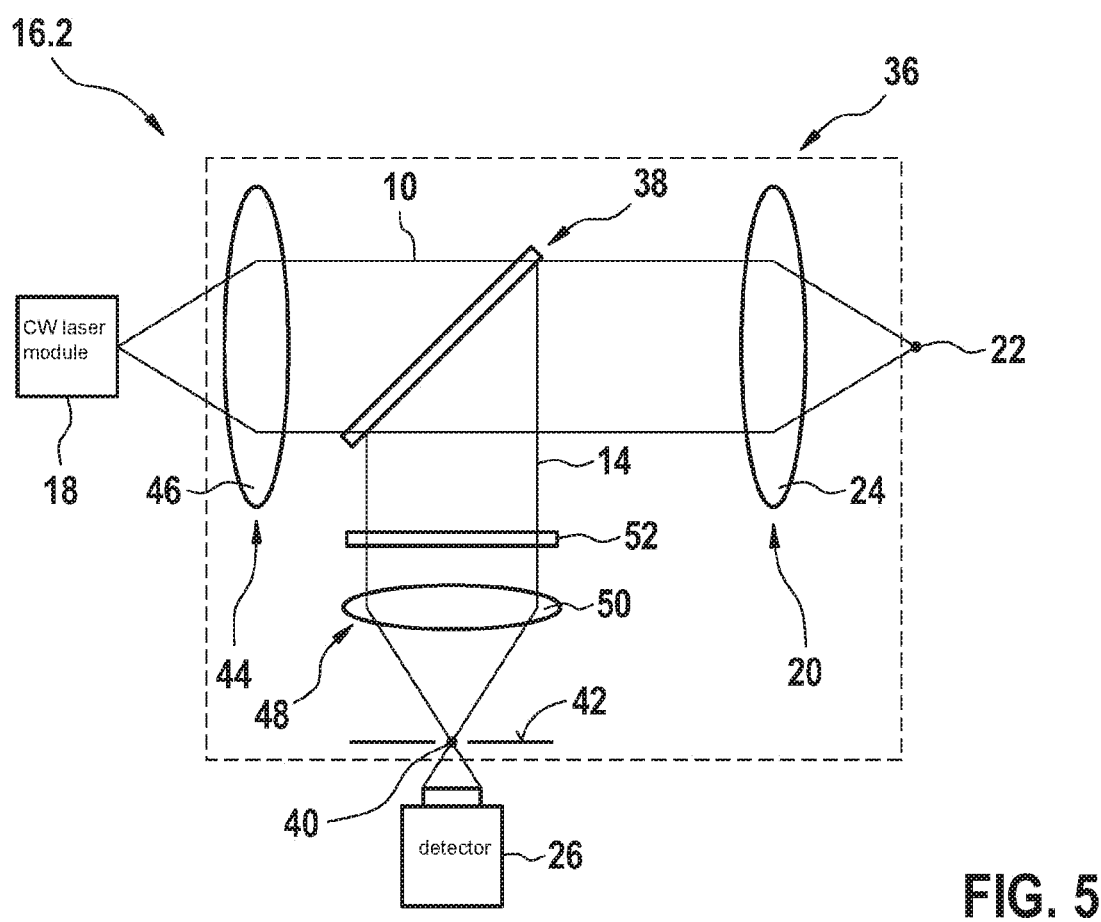
FIG. 5 shows an exemplifying embodiment of an optical part of a particle sensor according to the present invention that operates with parallel beam paths.

FIG. 5 shows a second exemplifying embodiment of second part 16.2 of particle sensor 16. The second exemplifying embodiment differs from the first exemplifying embodiment firstly in that optical apparatus 36 illuminates beam splitter 38 with collimated laser light 10. In this exemplifying embodiment optical apparatus 36 has a further optical element 44 that is disposed in the beam path of laser light 10 between module 18 and beam splitter 38 and is configured to parallelize laser light 10 proceeding from laser module 18 and direct it onto beam splitter 38. Further optical element 44 is preferably a lens 46.

Laser light 10 proceeding from laser module 18 is parallelized using further optical element 44, and propagates through beam splitter 38 to first focusing optical element 20. First focusing optical element 20 focuses laser light 10 into first spot 22. Here as well, radiation 14 proceeding from the heated particle in first spot 22 is directed via beam splitter 38 into the beam path leading to detector 26.

In this exemplifying embodiment, in order to generate second spot 40 optical apparatus 36 has a second focusing optical element 48 that is disposed in a beam path of radiation 14 which proceeds from beam splitter 38, and is configured to focus radiation 14 incident from beam splitter 38 into second spot 40. Second focusing optical element 48 is preferably a lens 50.

A wavelength-selective optical filter 52, which is less transparent to laser light 10 than to radiation 14 proceeding from spot 22, can be disposed between beam splitter 38 and detector 26, in particular between beam splitter 38 and second focusing optical element 48. Possible scattered light of the exciting laser (e.g., 405 nm) can thereby be filtered out. Radiation 14 that has thereby been filtered is then focused by second focusing optical element 48 into second spot 40. A wavelength-selective optical filter 52 of this kind can be combined with all the exemplifying embodiments.

Figure 6:
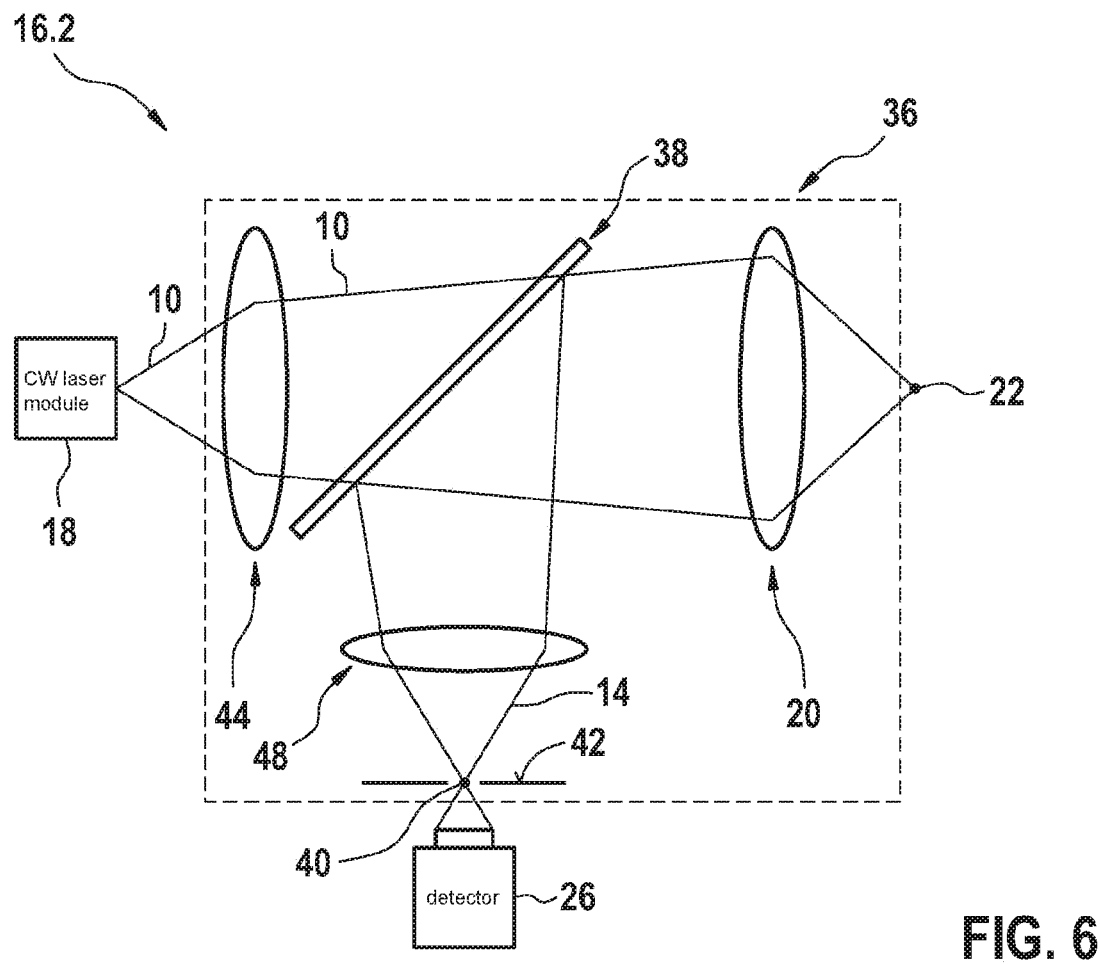
FIG. 6 shows a further exemplifying embodiment of an optical part of a particle sensor according to the present invention that operates with non-parallel beam paths.

The concept can also be constructed using an incompletely parallelized or non-parallelized laser beam. This is depicted in FIG. 3. FIG. 6 shows a further exemplifying embodiment of a second part 16.2 of a particle sensor 16 which operates with incompletely parallelized beam paths. This further exemplifying embodiment has an optical apparatus 36 that operates with a beam path directed in incompletely parallel fashion. Further optical element 44, which is disposed between laser module 18 and beam splitter 38, decreases the aperture angle of laser light 10 without aligning the laser light in completely parallel fashion. First focusing optical element 20 focuses laser light 10 proceeding from beam splitter 38 into first spot 22, and directs radiation 14 incident from first spot 22 onto beam splitter 38, in that context decreasing the aperture angle of the incident radiation 14. Beam splitter 38 directs radiation 14 incident from first focusing optical element 20 onto second focusing optical element 48. Second focusing element 48 directs the thermal radiation incident from beam splitter 38 into second spot 40.

Figure 7:
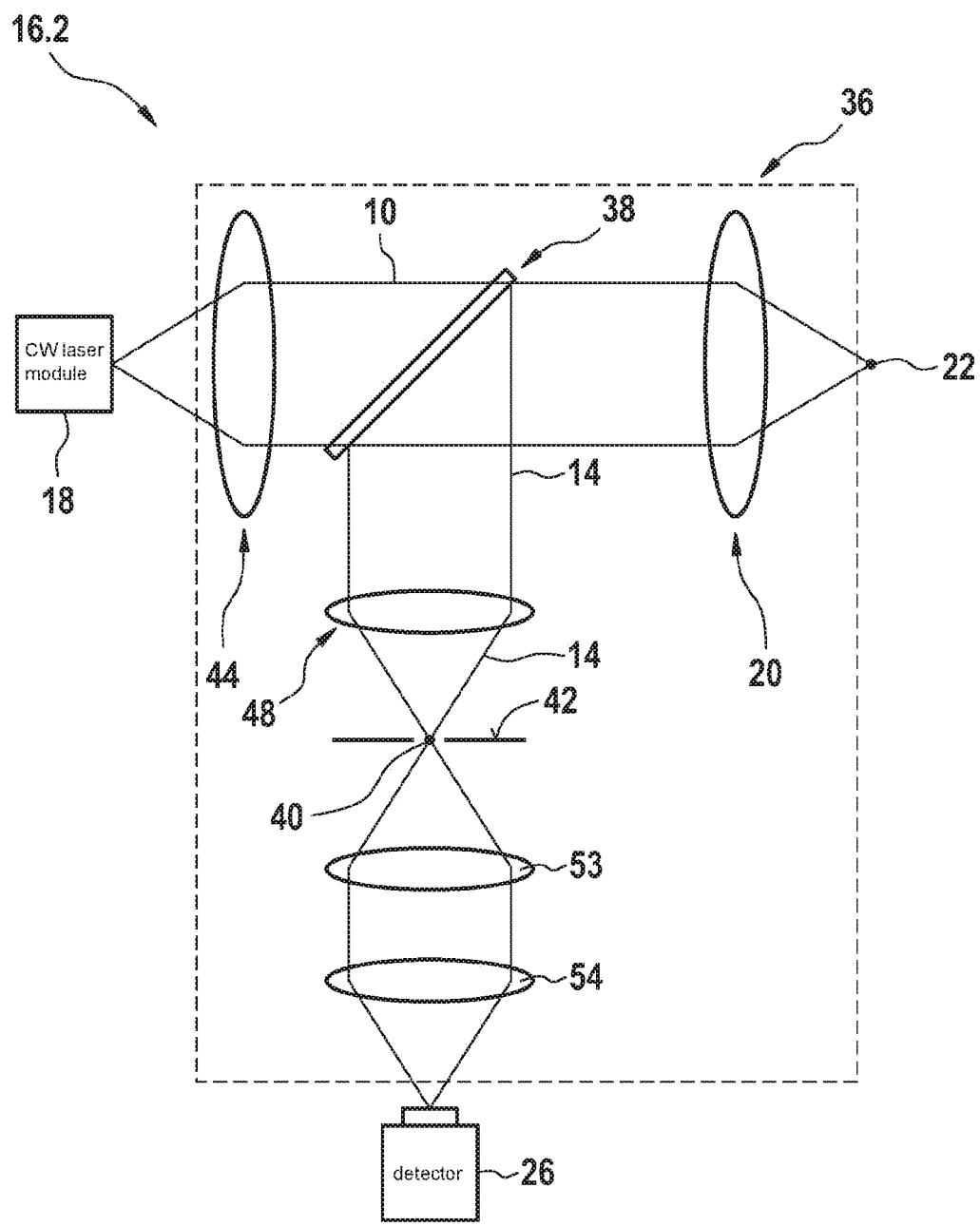
FIG. 7 shows a further exemplifying embodiment of an optical part of a particle sensor, having optical elements disposed between a second spot and a detector.

FIG. 7, like FIG. 4 previously, shows an exemplifying embodiment of a second part 16.2, operating with incompletely parallelized beam paths, of a particle sensor 16. In the exemplifying embodiment depicted in FIG. 7, a third optical element 53 is disposed in the beam path behind second spot 40, i.e. between the orifice plate and detector 26, in the beam path of radiation 14. A fourth optical element 54, which focuses radiation 14 incident from third optical element 53 onto detector 26, is disposed in the further beam path of radiation 14. The two optical elements 53 and 54 are preferably realized as lenses. Third optical element 53 re-parallelizes radiation 14 proceeding from second spot 40, while fourth optical element 54, lastly, focuses radiation 14 onto detector 26, which is now located overall a little way behind the orifice plate.

The exemplifying embodiments depicted in the Figures thus show all in all that the optical apparatus can be constructed with only one, with two, or even with more than two focusing optical elements such as lenses, or also mirrors.

Figure 8:
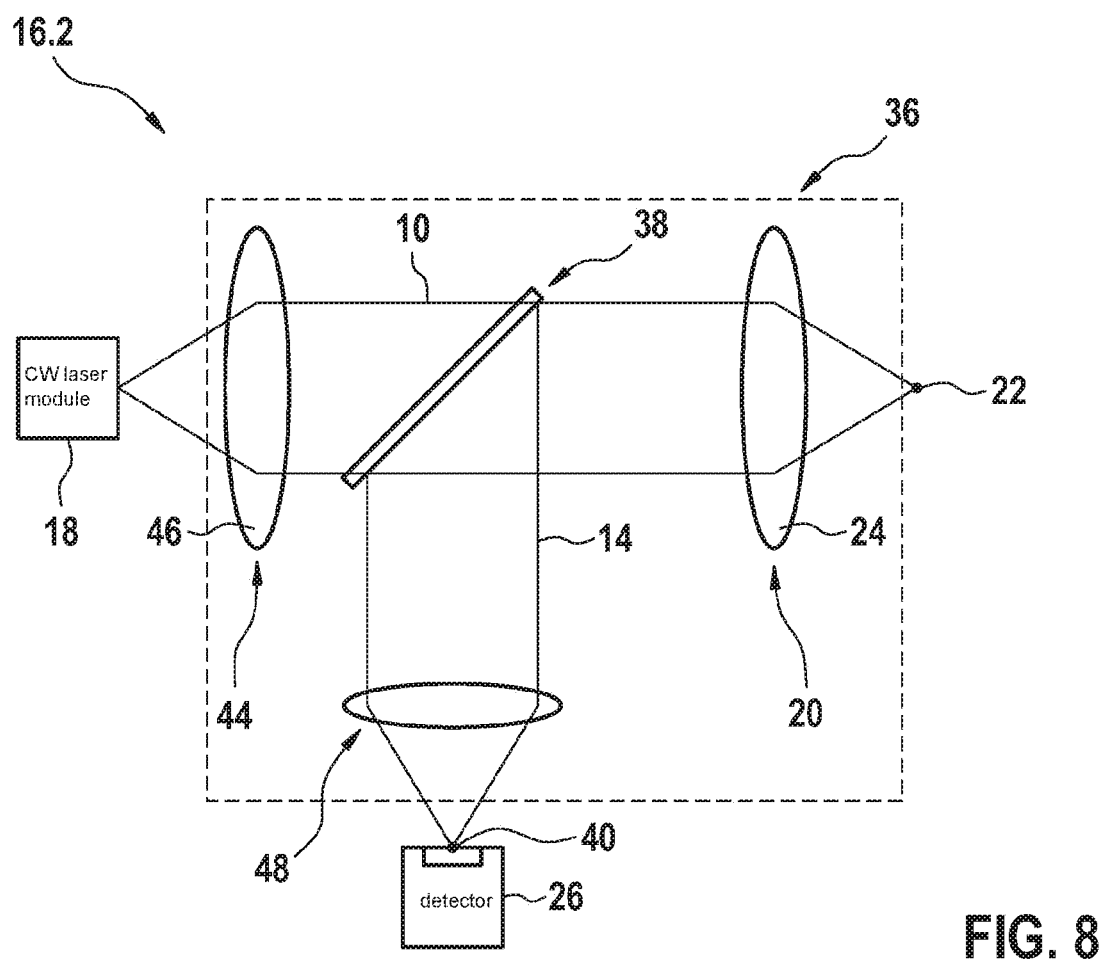
FIG. 8 shows a further exemplifying embodiment in which a detector also performs an orifice-plate function.

FIG. 8 shows a further exemplifying embodiment of the present invention. This exemplifying embodiment largely corresponds, in terms of its parallel beam path, to the exemplifying embodiment of FIG. 5. One difference between this exemplifying embodiment and all the exemplifying embodiments hitherto described is that here second spot 40 is not delimited by an orifice plate. Instead, detector 26 is disposed directly in second spot 40, or disposed so that second spot 40 lies on the radiation-sensitive detector surface and is delimited thereby. In this case the radiation-sensitive detector surface has the function of the orifice plate. Thermal radiation that is not incident onto that radiation-sensitive detector surface thus does not contribute to the measured signal and is thereby spatially filtered out. For efficient signal filtering, the radiation-sensitive detector surface must be correspondingly small. This embodiment can be combined with all the exemplifying embodiments presented here. Also possible is a configuration in which the positions of laser module 18 and detector 26 are transposed. Beam splitter 38, or the dichroic mirror, must then correspondingly possess an inverse functionality. It should then provide complete reflection of the exciting laser light 10, and complete transmission of the thermal radiation constituting the LII signal.

What is claimed is:

1. A particle sensor, comprising:
a laser module having a laser;
a detector configured to detect thermal radiation; and
an optical apparatus configured to focus laser light proceeding from the laser module into a first spot and to focus thermal radiation proceeding from the first spot into a second spot, a radiation-sensitive surface of the detector being located in the second spot, or behind the second spot in a beam path of the thermal radiation focused onto the second spot,
wherein the optical apparatus has a beam splitter and a first focusing optical element, the beam splitter being disposed in a beam path of the laser light between the laser module and the first focusing optical element,
wherein the first focusing optical element is configured to direct the thermal radiation proceeding from the first spot onto the beam splitter, and wherein the detector is disposed in a beam path of the thermal radiation which proceeds from the beam splitter,
wherein the particle sensor includes a first part that is configured to be exposed to a measured gas, and includes a second part that is not to be exposed to the measured gas and that contains optical components of the particle sensor, the two parts being separated by a partition that is impermeable to the measured gas; and
an assemblage made up of an outer protective tube and an inner protective tube, both the outer protective tube and the inner protective tube having a cylindrical shape or prismatic shape, wherein the outer protective tube and the inner protective tube are disposed coaxially to one another, axes of the cylindrical or prismatic shapes being oriented parallel to a direction of incidence of the laser light and the first spot being located in an interior of the inner protective tube, wherein the outer protective tube projects, at an end facing toward the laser module, beyond the inner protective tube, and the inner protective tube projects, at an opposite end, beyond the outer protective tube.

2. The particle sensor as recited in claim 1, wherein the first spot is located at a first focal point of the first focusing optical element, and the second spot is located at a second focal point of the first focusing optical element.

3. The particle sensor as recited in claim 2, wherein the optical apparatus has a second focusing optical element, the second focusing optical element being disposed in a beam path of the thermal radiation which proceeds from the beam splitter, and being configured to focus thermal radiation incident from the beam splitter into the second spot.

4. The particle sensor as recited in claim 3, wherein a wavelength-selective optical filter, which is less transparent to the laser light than to the thermal radiation proceeding from the first spot, is disposed, between the beam splitter and the second focusing optical element, in the beam path of the thermal radiation proceeding from the beam splitter.

5. The particle sensor as recited in claim 4, wherein the laser module is configured to emit laser light having wavelengths below 500 nm, and the wavelength-selective optical filter is configured in such a way that the wavelength-selective optical filter attenuates or blocks light having wavelengths below 500 nm.

6. The particle sensor as recited in claim 5, wherein the laser model is configured to emit laser light having wavelengths of 405 nm or 450 nm or 465 nm.

7. The particle sensor as recited in claim 1, wherein the radiation-sensitive surface of the detector is located behind the second spot in the beam path of the thermal radiation focused onto the second spot, and wherein the second spot is located in an opening of an orifice plate that is disposed in the beam path of the thermal radiation between the beam splitter and the detector.

8. The particle sensor as recited in claim 7, wherein a third optical element, which parallelizes thermal radiation proceeding from the orifice plate opening, is disposed in the beam path of the thermal radiation between the orifice plate and the detector, and a fourth optical element, which focuses the thermal radiation parallelized by the third optical element onto the detector, is disposed in a further beam path of the thermal radiation.

9. The particle sensor as recited in claim 1, wherein the optical apparatus has a further optical element that is disposed in the beam path of the laser light between the laser module and the beam splitter and is configured to parallelize laser light proceeding from the laser module and to direct it onto the beam splitter.

10. The particle sensor as recited in claim 1, wherein the laser is a semiconductor laser element.

11. The particle sensor as recited in claim 10, wherein the laser is a laser diode.

12. The particle sensor as recited in claim 1, wherein the beam splitter is a polarizing beam splitter, and the polarizing beam splitter is configured in such a way that the polarizing beam splitter is maximally transparent to incident laser light having a predetermined polarization direction.

13. The particle sensor as recited in claim 12, wherein the beam splitter is a dichroic mirror.

14. The particle sensor as recited in claim 1, wherein a window, which is transparent both to the laser light and to the thermal radiation proceeding from the first spot, is mounted in the partition in a beam path of the laser light.

15. A particle sensor, comprising:
a laser module having a laser;
a detector configured to detect thermal radiation;
an optical apparatus configured to focus laser light proceeding from the laser module into a first spot and to focus thermal radiation proceeding from the first spot into a second spot, a radiation-sensitive surface of the detector being located in the second spot, or behind the second spot in a beam path of the thermal radiation focused onto the second spot, wherein the particle sensor includes a first part that is configured to be exposed to a measured gas, and includes a second part that is not to be exposed to the measured gas and that contains optical components of the particle sensor, the two parts being separated by a partition that is impermeable to the measured gas; and
an assemblage made up of an outer protective tube and an inner protective tube, both the outer protective tube and the inner protective tube having a cylindrical shape or prismatic shape, wherein the outer protective tube and the inner protective tube are disposed coaxially to one another, axes of the cylindrical or prismatic shapes being oriented parallel to a direction of incidence of the laser light and the first spot being located in an interior of the inner protective tube, wherein the outer protective tube projects, at an end facing toward the laser module, beyond the inner protective tube, and the inner protective tube projects, at an opposite end, beyond the outer protective tube.

* * * * *